(12) United States Patent
Fukatani et al.

(10) Patent No.: US 11,248,149 B2
(45) Date of Patent: Feb. 15, 2022

(54) POLYVINYL ACETAL RESIN COMPOSITION, ADHESIVE SHEET, AND METHOD FOR PRODUCING ADHESIVE SHEET

(71) Applicant: SEKISUI CHEMICAL CO., LTD., Osaka (JP)

(72) Inventors: Juichi Fukatani, Osaka (JP); Kiyomi Uenomachi, Osaka (JP); Takazumi Okabayashi, Osaka (JP); Ryousuke Ebina, Osaka (JP); Atsushi Wada, Osaka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 524 days.

(21) Appl. No.: 15/764,971

(22) PCT Filed: Oct. 6, 2016

(86) PCT No.: PCT/JP2016/079804
§ 371 (c)(1),
(2) Date: Mar. 30, 2018

(87) PCT Pub. No.: WO2017/061547
PCT Pub. Date: Apr. 13, 2017

(65) Prior Publication Data
US 2018/0258326 A1    Sep. 13, 2018

(30) Foreign Application Priority Data
Oct. 7, 2015 (JP) .............................. JP2015-199737

(51) Int. Cl.
| C09J 129/14 | (2006.01) |
| C09J 7/10 | (2018.01) |
| C09J 7/30 | (2018.01) |
| C09J 4/00 | (2006.01) |
| C08L 29/14 | (2006.01) |
| C08F 116/38 | (2006.01) |
| C08K 5/101 | (2006.01) |
| C08K 5/1515 | (2006.01) |
| C08K 5/07 | (2006.01) |
| C08K 5/00 | (2006.01) |
| B29K 105/00 | (2006.01) |

(52) U.S. Cl.
CPC ........... *C09J 129/14* (2013.01); *C08F 116/38* (2013.01); *C08K 5/0025* (2013.01); *C08K 5/07* (2013.01); *C08K 5/101* (2013.01); *C08K 5/1515* (2013.01); *C08L 29/14* (2013.01); *C09J 4/00* (2013.01); *C09J 7/10* (2018.01); *C09J 7/30* (2018.01); *B29K 2105/0097* (2013.01); *C08K 5/0016* (2013.01); *C09J 2301/304* (2020.08); *C09J 2301/408* (2020.08); *C09J 2301/416* (2020.08); *C09J 2433/00* (2013.01)

(58) Field of Classification Search
None
See application file for complete search history.

(56) References Cited

U.S. PATENT DOCUMENTS

| 4,568,405 | A | * | 2/1986 | Lin | ....................... C08F 261/12 |
| | | | | | 156/275.5 |
| 4,751,108 | A | * | 6/1988 | Larimore | ................. C09J 7/385 |
| | | | | | 427/171 |
| 7,070,051 | B2 | * | 7/2006 | Kanner | ............ A61B 17/06133 |
| | | | | | 206/382 |
| 2011/0206869 | A1 | | 8/2011 | Nemoto et al. | |
| 2013/0000725 | A1 | | 1/2013 | Oliver et al. | |
| 2013/0157065 | A1 | | 6/2013 | Shimamoto et al. | |
| 2013/0267647 | A1 | | 10/2013 | Tsujimoto et al. | |
| 2014/0315028 | A1 | | 10/2014 | Shimamoto et al. | |
| 2016/0062016 | A1 | * | 3/2016 | Lee | .................. G02F 1/133528 |
| | | | | | 359/483.01 |

FOREIGN PATENT DOCUMENTS

| CN | 103003218 | 3/2013 |
| JP | 49-97049 | 9/1974 |
| JP | 54-096541 | 7/1979 |
| JP | 59-207913 | 11/1984 |

(Continued)

OTHER PUBLICATIONS

International Search Report dated Dec. 13, 2016 in International (PCT) Application No. PCT/JP2016/079804.
Extended European Search Revort dated Mar. 1, 2019 in corresponding European Patent Application No. 16853699.3.
Database WPI, Week 197937, Thomson Scientific, London, GB; AN 1979-66746B, XP002788840.
Database WPI, Week 201116. Thomson Scientific. London. GB: AN 2011-B88247, XP002788841.

*Primary Examiner* — Frank D Ducheneaux
(74) *Attorney, Agent, or Firm* — Wenderoth, Lind & Ponack, L.L.P.

(57) ABSTRACT

The present invention aims to provide a polyvinyl acetal resin composition that is moldable by an extrusion method and capable of exhibiting excellent heat resistance after molding, an adhesive sheet containing the polyvinyl acetal resin composition, and a method for producing the adhesive sheet. The present invention relates to a polyvinyl acetal resin composition including: a polyvinyl acetal; a reactive diluent; and a photopolymerization initiator, the polyvinyl acetal resin composition having a storage modulus G' at 200° C. before irradiation with light of $8 \times 10^4$ Pa or lower and a storage modulus G' at 200° C. after irradiation with light of $8 \times 10^3$ Pa or higher, with the storage modulus G' at 200° C. after irradiation with light being higher than the storage modulus G' at 200° C. before irradiation with light.

10 Claims, No Drawings

(56) References Cited

FOREIGN PATENT DOCUMENTS

| | | |
|---|---:|---:|
| JP | 64-1737 | 1/1989 |
| JP | 7-319160 | 12/1995 |
| JP | 2005-325278 | 11/2005 |
| JP | 2011-037971 | 2/2011 |
| TW | 201022387 | 6/2010 |

\* cited by examiner

POLYVINYL ACETAL RESIN COMPOSITION, ADHESIVE SHEET, AND METHOD FOR PRODUCING ADHESIVE SHEET

TECHNICAL FIELD

The present invention relates to a polyvinyl acetal resin composition that is moldable by an extrusion method and capable of exhibiting excellent heat resistance after molding. The present invention also relates to an adhesive sheet containing the polyvinyl acetal resin composition, and a method for producing the adhesive sheet.

BACKGROUND ART

Polyvinyl acetal is widely used for various applications such as coatings, wash primers, binders for ceramics, and interlayer films for a laminated glass, because of its excellent toughness, adhesiveness to inorganic substances, and solubility in organic solvents.

Typically, polyvinyl acetal is plasticized with a plasticizer and molded by an extrusion method before put to various uses (e.g., Patent Literature 1). Plasticized polyvinyl acetal, however, has low heat resistance after molding. Thus, when plasticized polyvinyl acetal is used to bond substrates together, for example, the resin composition may soften at high temperature and deform due to the weight of the substrates, causing a change in the positional relation between the bonded substrates (hereinafter, also referred to as "plate misalignment"). The polyvinyl acetal resin thus unfortunately cannot be used in applications that require durability at high temperatures, such as adhesive sheets for fixing interior components of automobiles or adhesive sheets for fixing house building materials.

CITATION LIST

Patent Literature

Patent Literature 1: JP 2005-325278 A

SUMMARY OF INVENTION

Technical Problem

In view of the situation in the art, the present invention aims to provide a polyvinyl acetal resin composition that is moldable by an extrusion method and capable of exhibiting excellent heat resistance after molding. The present invention also aims to provide an adhesive sheet containing the polyvinyl acetal resin composition, and a method for producing the adhesive sheet.

Solution to Problem

The present invention includes a polyvinyl acetal resin composition including: a polyvinyl acetal; a reactive diluent; and a photopolymerization initiator, the polyvinyl acetal resin composition having a storage modulus G' at 200° C. before irradiation with light of $8 \times 10^4$ Pa or lower and a storage modulus G' at 200° C. after irradiation with light of $8 \times 10^3$ Pa or higher, with the storage modulus G' at 200° C. after irradiation with light being higher than the storage modulus G' at 200° C. before irradiation with light.

The present invention will be described in detail below.

The present inventors made intensive studies to find out that mixing a polyvinyl acetal with a reactive diluent and a photopolymerization initiator provides a polyvinyl acetal resin composition whose storage modulus can be changed by irradiation with light. The inventors found out that adjusting the storage modulus G' at 200° C. before irradiation with light to a certain level or lower enables molding by an extrusion method, while adjusting the storage modulus G' at 200° C. to a certain level or higher by reacting the reactive diluent under irradiation with light after molding allows excellent heat resistance to be exhibited. The inventors thus completed the present invention.

Since the polyvinyl acetal resin composition is moldable by an extrusion method, an adhesive sheet with a thickness that is difficult to form by an application method (e.g., 100 μm or greater) can be easily achieved. In addition, solvents, which are essential in application methods, are not needed. Moreover, the polyvinyl acetal resin composition can be molded into shapes other than a sheet shape, such as a pellet shape.

The polyvinyl acetal resin composition of the present invention contains a polyvinyl acetal, a reactive diluent, and a photopolymerization initiator.

The polyvinyl acetal can be prepared by saponifying polyvinyl acetate to prepare polyvinyl alcohol and then acetalizing the polyvinyl alcohol with an aldehyde in the presence of a catalyst. The degree of saponification of the polyvinyl alcohol is not particularly limited, and is commonly within a range of 70 to 99.9 mol %. The degree of saponification is preferably 70 to 99.8 mol %, more preferably 80 to 99.8 mol %.

For acetalization of the polyvinyl alcohol with an aldehyde in the presence of a catalyst, a solution containing the polyvinyl alcohol may be used. An exemplary solvent used for the solution containing the polyvinyl alcohol is water.

The aldehyde is not particularly limited. Commonly, a C1-C10 aldehyde is favorably used.

The C1-C10 aldehyde is not particularly limited, and may be either a linear aldehyde or a branched aldehyde. Examples thereof include n-butyraldehyde, isobutyraldehyde, n-valeraldehyde, 2-ethylbutyraldehyde, n-hexylaldehyde, n-octylaldehyde, n-nonylaldehyde, n-decylaldehyde, formaldehyde, acetaldehyde, and benzaldehyde. Among these, preferred are n-butyraldehyde, n-hexylaldehyde, and n-valeraldehyde, and more preferred is n-butyraldehyde. These aldehydes may be used alone or in combination of two or more thereof.

In other words, the polyvinyl acetal preferably contains polyvinyl butyral (when the aldehyde is n-butyraldehyde, the polyvinyl acetal is referred to as polyvinyl butyral). The use of the polyvinyl butyral allows appropriate adhesion force to glass, leading to better light resistance and weather resistance. Two or more types of polyvinyl acetals may be optionally used in combination.

The average degree of polymerization of the polyvinyl acetal is not limited. The lower limit of the average degree of polymerization is preferably 100, and the upper limit thereof is preferably 4,000. When the average degree of polymerization is within this range, the polyvinyl acetal resin composition before irradiation with light can have a storage modulus G' at 200° C. of a certain level or lower to exhibit good extrusion moldability, and the polyvinyl acetal composition after irradiation with light can have a storage modulus G' at 200° C. of a certain level or higher to exhibit excellent toughness and flexural rigidity at high temperatures. The lower limit of the average degree of polymerization is more preferably 150, and the upper limit thereof is more preferably 3,500. The lower limit is still more preferably 200, and the upper limit is still more preferably 3,000.

The average degree of polymerization of the polyvinyl acetal as used herein refers to a viscosity average degree of polymerization determined by a method described in JIS K6728:1977. In the case where the polyvinyl acetal resin used is a mixture of two or more types of polyvinyl acetal resins, the average degree of polymerization of the polyvinyl acetal refers to an apparent viscosity average degree of polymerization of the whole polyvinyl acetal resin mixture.

The average degree of polymerization of the polyvinyl acetal is identical to the average degree of polymerization of the polyvinyl alcohol used in production of the polyvinyl acetal. In other words, polyvinyl alcohol resin and polyvinyl acetal resin obtained by acetalizing the polyvinyl alcohol resin have the same degree of polymerization.

The average degree of polymerization of the polyvinyl alcohol as used herein refers to a viscosity average degree of polymerization obtained based on JIS K6726:1994. In the case where the polyvinyl alcohol resin used is a mixture of two or more types of polyvinyl alcohol resins, the average degree of polymerization of the polyvinyl alcohol refers to an apparent viscosity average degree of polymerization of the whole polyvinyl alcohol resin mixture.

The lower limit of the content rate of hydroxy groups (hydroxy group content) of the polyvinyl acetal is preferably 16 mol % and the upper limit thereof is preferably 45 mol %. When the hydroxy group content is within this range, high adhesiveness to adherends can be exhibited, and moisture resistance and weather resistance can be improved. The lower limit of the hydroxy group content is more preferably 18 mol %, still more preferably 20 mol %, particularly preferably 22 mol %. The upper limit thereof is more preferably 40 mol %, still more preferably 38 mol %, further preferably 36 mol %, particularly preferably 35 mol %.

The hydroxy group content of the polyvinyl acetal is a value in percentage of the mole fraction (mol %) obtained by dividing the amount of ethylene groups to which hydroxy groups are bonded by the total amount of ethylene groups of the main chain. The amount of ethylene groups to which hydroxy groups are bonded can be determined, for example, by the method in conformity with JIS K6728 "Testing methods for polyvinyl butyral".

The lower limit of the degree of acetylation (acetyl group content) of the polyvinyl acetal is preferably 0.1 mol % and the upper limit thereof is preferably 30 mol %. When the acetyl group content is within this range, high compatibility with the reactive diluent can be exhibited, and moisture resistance and weather resistance can be improved. The lower limit of the acetyl group content is more preferably 0.2 mol %, still more preferably 0.3 mol %. The upper limit thereof is more preferably 24 mol %, still more preferably 20 mol %, further preferably 19.5 mol %, particularly preferably 15 mol %.

The acetyl group content of the polyvinyl acetal is a value in percentage of the mole fraction (mol %) obtained by subtracting the amount of ethylene groups to which acetal groups are bonded and the amount of ethylene groups to which hydroxy groups are bonded from the total amount of ethylene groups of the main chain and then dividing the obtained value by the total amount of ethylene groups of the main chain. The amount of ethylene groups to which acetal groups are bonded can be determined, for example, in conformity with JIS K6728 "Testing methods for polyvinyl butyral".

The acetyl group content of the polyvinyl acetal is controlled within the above range, for example, by adjusting the degree of saponification of the polyvinyl alcohol. In other words, the acetyl group content of the polyvinyl acetal depends on the degree of saponification of the polyvinyl alcohol. In the case where the polyvinyl alcohol used has a lower degree of saponification, the acetyl group content of the polyvinyl acetal is increased. By contrast, in the case where the polyvinyl alcohol used has a higher degree of saponification, the acetyl group content of the polyvinyl acetal is reduced.

The lower limit of the degree of acetalization of the polyvinyl acetal is preferably 50 mol % and the upper limit thereof is preferably 85 mol %. When the degree of acetalization is 50 mol % or higher, the compatibility with the reactive diluent is enhanced. When the degree of acetalization is within this range, the reaction time needed for the production of the polyvinyl acetal can be shortened. The lower limit of the degree of acetalization is more preferably 54 mol %, still more preferably 58 mol %, particularly preferably 60 mol %. The upper limit of the degree of acetalization is more preferably 82 mol %, still more preferably 79 mol %, particularly preferably 77 mol %.

The degree of acetalization of the polyvinyl acetal is a value in percentage of the mole fraction (mol %) obtained by dividing the amount of ethylene groups to which acetal groups are bonded by the total amount of ethylene groups of the main chain. The degree of acetalization can be determined by measuring the acetyl group content and the vinyl alcohol content (content rate of hydroxy groups) by the method in conformity with JIS K6728 "Testing methods for polyvinyl butyral", calculating the mole fractions based on the measurement results, and subtracting the acetyl group content and the vinyl alcohol content from 100 mol %.

The degree of acetalization of the polyvinyl acetal can be controlled, for example, by adjusting the amount of the aldehyde. When the amount of the aldehyde is smaller, the degree of acetalization of the polyvinyl acetal is lowered. When the amount of the aldehyde is larger, the degree of acetalization of the polyvinyl acetal is increased.

The reactive diluent as used herein means an agent which is compatible with the polyvinyl acetal and capable of adjusting the storage modulus G' at 200° C. of the polyvinyl acetal resin composition to a certain level or lower to enable molding by an extrusion method, and whose molecules react with each other under irradiation with light to cause cross-linking and curing reactions to adjust the storage modulus G' at 200° C. of the polyvinyl acetal resin composition to a certain level or higher.

Examples of the reactive diluent include (meth)acrylic reactive diluents such as (meth)acrylic monomers and (meth)acrylic oligomers, epoxy reactive diluents such as epoxy monomers and epoxy oligomers, and silicone reactive diluents such as alkoxysilane monomers and alkoxysilane oligomers. These reactive diluents may be used alone or in combination of two or more thereof. Preferred among these are (meth)acrylic reactive diluents because they are highly compatible with the polyvinyl acetal and easily cause cross-linking and curing reactions when used in combination with a photopolymerization initiator.

The (meth)acrylic monomer used may be a monofunctional, bifunctional, or tri- or higher functional (meth)acrylic monomer.

Examples of the monofunctional (meth)acrylic monomer include methyl (meth)acrylate, ethyl (meth)acrylate, propyl (meth)acrylate, butyl (meth)acrylate, 2-hydroxyethyl (meth)acrylate, diethylene glycol monoethyl ether (meth)acrylate, isobornyl (meth)acrylate, 3-methoxybutyl (meth)acrylate, 2-acryloyloxyethyl-2-hydroxypropyl phthalate, and 2-methacryloyloxyethyl-2-hydroxylpropyl phthalate.

Examples of the bifunctional (meth)acrylic monomer include ethylene glycol di(meth)acrylate, diethylene glycol di(meth)acrylate, tetraethylene glycol di(meth)acrylate, 1,6-hexanediol dimethacrylate, 1,9-nonanediol diacrylate, polytetramethylene glycol di(meth)acrylate, neopentyl glycol di(meth)acrylate, 1,3-butylene glycol di(meth)acrylate, and 2,2-bis[4-(methacryloxyethoxy)phenyl]propane di(meth)acrylate.

Examples of the tri- or higher functional (meth)acrylic monomer include trimethylolpropane triacrylate, pentaerythritol triacrylate, pentaerythritol trimethacrylate, pentaerythritol tetramethacrylate, dipentaerythritol pentaacrylate, dipentaerythritol hexaacrylate, tri(2-acryloyloxy ethyl) phosphate, tetramethyrolmethane tri(meth)acrylate, tetramethylol propane tetra(meth)acrylate, triallyl isocyanurate, and derivatives thereof.

The above (meth)acrylic monomers may be used alone or in combination of two or more thereof. In particular, preferred are monofunctional (meth)acrylic monomers as they are particularly excellent in compatibility with the polyvinyl acetal. More specifically, preferred are methyl (meth)acrylate, ethyl (meth)acrylate, propyl (meth)acrylate, butyl (meth)acrylate, and 2-hydroxyethyl acrylate.

Examples of the (meth)acrylic oligomers include those including a plurality of the (meth)acrylic monomers bonded to each other. In particular, preferred is a (meth)acrylic oligomer prepared from the (meth)acrylic monomer because such an oligomer is particularly excellent in compatibility with the polyvinyl acetal.

Examples of the epoxy monomers include: glycidyl ester epoxy monomers of bisphenol A type, bisphenol F type, bisphenol AD type, bromine-containing bisphenol A type, phenol novolac type, cresol novolac type, polyphenol type, linear aliphatic type, butadiene type, urethane type and the like; aliphatic glycidyl ester epoxy monomers such as glycidyl hexahydrophthalate, dimer glycidyl ester, aromatic type, cycloaliphatic type and like epoxy monomers; methyl-substituted epoxy monomers of bisphenol type, ester type, high-molecular-weight ether ester type, ether ester type, brominated type, novolac type, and the like; heterocyclic epoxy monomers; glycidyl amine epoxy monomers such as triglycidyl isocyanurate and tetraglycidyl diaminodiphenyl methane; linear aliphatic epoxy monomers such as epoxylated polybutadiene and epoxy soybean oil; cycloaliphatic epoxy monomers; naphthalene novolac-type epoxy monomers; and diglycidyl oxynaphthalene epoxy monomers.

Examples of the epoxy oligomers include those including a plurality of the epoxy monomers bonded to each other. Preferred among these are epoxy oligomers prepared from the epoxy monomers.

Examples of the alkoxysilane monomers include methyltrimethoxysilane, dimethyldimethoxysilane, phenyltrimethoxysilane, methyltriethoxysilane, dimethyldiethoxysilane, phenyltriethoxysilane, n-propyltrimethoxysilane, n-propyltriethoxysilane, hexyltrimethoxysilane, hexyltriethoxysilane, octyltrimethoxysilane, decyltrimethoxysilane, and 1,6-bis(trimethoxysilyl)hexane.

Examples of the alkoxysilane oligomers include those including a plurality of the alkoxysilane monomers bonded to each other. Preferred among these are alkoxysilane oligomers prepared from the alkoxysilane monomers.

The amount of the reactive diluent in the polyvinyl acetal resin composition of the present invention is not particularly limited. The lower limit of the amount of the reactive diluent relative to 100 parts by weight of the polyvinyl acetal is preferably 0.1 parts by weight and the upper limit thereof is preferably 30 parts by weight. When the amount of the reactive diluent is within this range, the polyvinyl acetal resin composition before the reaction of the reactive diluent can have a storage modulus G' at 200° C. of a certain level or lower to exhibit good extrusion moldability, and the polyvinyl acetal resin composition after the reaction of the reactive diluent can have a storage modulus G' at 200° C. of a certain level or higher to exhibit excellent toughness and flexural rigidity at high temperatures. The lower limit of the amount of the reactive diluent is more preferably 1 part by weight and the upper limit thereof is more preferably 20 parts by weight. The lower limit is still more preferably 2 parts by weight and the upper limit is still more preferably 15 parts by weight. The lower limit is particularly preferably 3 parts by weight and the upper limit is particularly preferably 10 parts by weight.

The photopolymerization initiator may be appropriately selected in accordance with the type of the reactive diluent. In the case where a (meth)acrylic reactive diluent is used as the reactive diluent, for example, a persulfate, an organic peroxide, an azo compound, or the like may be used. These photopolymerization initiators may be used alone or in combination of two or more thereof.

Extrusion using a polyvinyl acetal having a high degree of polymerization requires a relatively high temperature. When a thermal polymerization initiator is used in such cases, polymerization may proceed during molding, making extrusion difficult. When a photopolymerization initiator is used, favorable extrusion is possible even in such cases. Here, a photopolymerization initiator and a thermal polymerization initiator may be used in combination, as long as extrusion is possible.

The amount of the photopolymerization initiator in the polyvinyl acetal resin composition of the present invention is not particularly limited. The lower limit thereof is preferably 0.01 parts by weight and the upper limit thereof is preferably 5 parts by weight, relative to 100 parts by weight of the reactive diluent. When the amount of the photopolymerization initiator is within this range, the reactive diluent can be reacted surely and in a short time. Moreover, bleeding of the residual photopolymerization initiator is not likely to occur. The lower limit of the amount of the photopolymerization initiator is more preferably 0.1 parts by weight and the upper limit thereof is more preferably 2 parts by weight.

Preferably, the polyvinyl acetal resin composition of the present invention further contains a plasticizer. The addition of the plasticizer reduces the storage modulus G' at 200° C. of the polyvinyl acetal resin composition before irradiation with light, allowing the composition to exhibit higher extrusion moldability.

The plasticizer is not particularly limited and a conventionally known plasticizer usable for polyvinyl acetals may be used. Examples of the plasticizer include organic acid ester plasticizers such as monobasic organic acid esters and polybasic organic acid esters, and phosphoric acid plasticizers such as organophosphate plasticizers and organophosphite plasticizers. Preferred among these are organic acid ester plasticizers. These plasticizers may be used alone or in combination of two or more thereof. The plasticizer is preferably a liquid plasticizer.

The monobasic organic acid ester is not particularly limited, and examples thereof include glycol esters obtainable by reaction between a monobasic organic acid (e.g., butyric acid, isobutyric acid, caproic acid, 2-ethylbutyric acid, heptanoic acid, n-octylic acid, 2-ethylhexylic acid, pelargonic acid (n-nonylic acid), decylic acid) and a glycol (e.g., triethylene glycol, tetraethylene glycol, tripropylene glycol).

The polybasic organic acid ester is not particularly limited, and examples thereof include ester compounds obtainable by reaction between a polybasic organic acid (e.g., adipic acid, sebacic acid, azelaic acid) and a C4-C8 linear or branched alcohol.

The organic acid ester plasticizer is preferably a diester plasticizer represented by the following formula (1). The use of the diester plasticizer improves the moldability of the polyvinyl acetal resin composition.

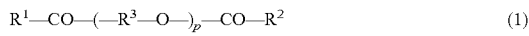

(1)

In the formula (1), $R^1$ and $R^2$ each represent a C5-C10 (preferably C6-C10) organic group, $R^3$ represents an ethylene, isopropylene, or n-propylene group, and p represents an integer of 3 to 10.

Specific examples of the organic acid ester include triethylene glycol-di-2-ethylbutyrate, triethylene glycol-di-2-ethylhexanoate, triethylene glycol dicaprylate, triethylene glycol-di-n-octanoate, triethylene glycol-di-n-heptanoate, tetraethylene glycol-di-n-heptanoate, tetraethylene glycol-di-2-ethylhexanoate, dibutyl sebacate, dioctyl azelate, dibutyl carbitol adipate, ethylene glycol-di-2-ethylbutyrate, 1,3-propylene glycol-di-2-ethylbutyrate, 1,4-butylene glycol-di-2-ethylbutyrate, diethylene glycol-di-2-ethylbutyrate, diethylene glycol-di-2-ethylhexanoate, dipropylene glycol-di-2-ethylbutyrate, triethylene glycol-di-2-ethylpentanoate, tetraethylene glycol-di-2-ethylbutyrate, diethylene glycol dicaprylate, dihexyl adipate, dioctyl adipate, hexylcyclohexyl adipate, diisononyl adipate, heptylnonyl adipate, oil-modified alkyd sebacate, mixtures of phosphoric acid esters and adipic acid esters, and mixed type adipic acid esters prepared from a C4-C9 alkyl alcohol and a C4-C9 cyclic alcohol.

The organophosphate plasticizer is not particularly limited, and examples thereof include tributoxyethyl phosphate, isodecylphenyl phosphate, and triisopropyl phosphate.

Among the plasticizers, preferred is at least one selected from the group consisting of dihexyl adipate (DHA), triethylene glycol-di-2-ethylhexanoate (3GO), tetraethylene glycol-di-2-ethylhexanoate (4GO), triethylene glycol-di-2-ethyl butyrate (3GH), tetraethylene glycol-di-2-ethyl butyrate (4GH), tetraethylene glycol-di-n-heptanoate (4G7) and triethylene glycol-di-n-heptanoate (3G7). More preferred are triethylene glycol-di-2-ethylbutyrate, triethylene glycol-di-n-heptanoate (3G7), and triethylene glycol-di-2-ethylhexanoate (3GO), and still more preferred is triethylene glycol-di-2-ethylhexanoate.

The amount of the plasticizer is not particularly limited. The lower limit of the amount of the plasticizer relative to 100 parts by weight of the polyvinyl acetal is preferably 1 part by weight and the upper limit thereof is preferably 30 parts by weight. When the amount of plasticizer is within the above range, the plasticizer reduces the storage modulus G' at 200° C. of the polyvinyl acetal resin composition before irradiation with light, imparting higher extrusion moldability. In addition, the plasticizer in an amount within the range does not greatly reduce the storage modulus G' at 200° C. after irradiation with light, thus allowing the polyvinyl acetal resin composition to exhibit excellent toughness and flexural rigidity at high temperatures. The lower limit of the amount of the plasticizer is more preferably 4 parts by weight and the upper limit thereof is more preferably 20 parts by weight.

The polyvinyl acetal resin composition of the present invention may contain known additives such as an adhesion modifier, a tackifier resin, a plasticizer, an emulsifier, a softener, fine particles, a filler, a pigment, a dye, a silane coupling agent, an antioxidant, a surfactant, and wax, if necessary.

The polyvinyl acetal resin composition of the present invention may be produced by any method. An exemplary method includes mixing the polyvinyl acetal, the reactive diluent, the photopolymerization initiator, and if necessary, additives.

The polyvinyl acetal resin composition of the present invention may be used in the form of a liquid (e.g., dispersion, emulsion) or in a sheet shape. The polyvinyl acetal resin composition of the present invention is moldable by an extrusion method, and thus can be easily molded into a sheet shape and used as an adhesive sheet.

The adhesive sheet containing the polyvinyl acetal resin composition of the present invention is also included in the present invention.

Since the polyvinyl acetal resin composition of the present invention contains the reactive diluent and the photopolymerization initiator, the storage modulus of the polyvinyl acetal resin composition can be changed by irradiation with light.

The irradiation with light may be conducted by any method. In an exemplary method, an ultraviolet light irradiation device such as an ultra-high pressure mercury lamp is used for irradiation with light.

The wavelength or illuminance of the light used in the irradiation may be appropriately determined in accordance with the types of the reactive diluent and the photopolymerization initiator or the like. For example, when the reactive diluent used is a (meth)acrylic reactive diluent and the photopolymerization initiator used is benzophenone in an amount of 0.5 to 1 parts by weight relative to 100 parts by weight of the reactive diluent, preferred is irradiation with light having a wavelength of 365 nm at a dose of 2,000 to 6,000 mJ/cm$^2$.

The polyvinyl acetal resin composition of the present invention has a storage modulus G' at 200° C. before irradiation with light of $8 \times 10^4$ Pa or lower and a storage modulus G' at 200° C. after irradiation with light of $8 \times 10^3$ Pa or higher, with the storage modulus G' at 200° C. after irradiation with light being higher than the storage modulus G' at 200° C. before irradiation with light. With the storage moduli G' at 200° C. before and after irradiation with light adjusted as above, the polyvinyl acetal resin composition of the present invention before irradiation with light exhibits high extrusion moldability to be moldable by an extrusion method, and also excellent heat resistance can be exhibited by irradiation with light after molding.

The storage modulus G' at 200° C. before the reaction of the reactive diluent is preferably $4 \times 10^4$ Pa or lower, more preferably $3 \times 10^4$ Pa or lower, still more preferably $2 \times 10^4$ Pa or lower.

The storage modulus G' at 200° C. after the reaction of the reactive diluent is preferably $1 \times 10^4$ Pa or higher, more preferably $2 \times 10^4$ Pa or higher, still more preferably $6 \times 10^4$ Pa or higher.

The storage modulus can be measured using a dynamic viscoelastometer such as ARES-G2 (TA Instruments) or DVA-200 (IT Measurement Co., Ltd.) under the condition that the temperature is lowered from 100° C. to −25° C. at a temperature decreasing rate of 3° C./min and under the conditions of a frequency of 1 Hz and a strain of 1%.

The polyvinyl acetal resin composition of the present invention preferably has a capillary viscosity at 190° C. of 7,000 Pa·s or lower before irradiation with light. When the capillary viscosity at 190° C. is 7,000 Pa·s or lower, the polyvinyl acetal resin composition can exhibit higher extrusion moldability. The capillary viscosity at 190° C. is more preferably 4,000 Pa·s or lower, still more preferably 2,000 Pa·s or lower, particularly preferably 1,000 Pa·s or lower.

The capillary viscosity can be measured by the method A2 specified in JIS K 7199 (1999) using a capillary rheometer.

The polyvinyl acetal resin composition of the present invention preferably has a breaking strength at 85° C. of 0.3 MPa or higher. This allows the molded polyvinyl acetal resin composition to exhibit higher heat resistance. The breaking strength at 85° C. is more preferably 0.9 MPa or higher, still more preferably 2 MPa or higher.

The breaking strength at 85° C. can be measured in conformity with JIS K 7161:2014 using TENSILON RTC (Orientec Co., Ltd.).

The present invention also includes a method for producing an adhesive sheet, including the steps of extruding a polyvinyl acetal resin composition containing a polyvinyl acetal, a reactive diluent, and a photopolymerization initiator and having a storage modulus G' at 200° C. of $8 \times 10^4$ Pa or lower into a sheet shape; and irradiating the sheet-shaped polyvinyl acetal resin composition with light to increase the storage modulus G' at 200° C. to a value that is equal to or higher than $8 \times 10^3$ Pa and higher than the storage modulus G' at 200° C. before irradiation with light.

The polyvinyl acetal resin composition of the present invention is suitable for use in applications that require durability at high temperatures, such as adhesive sheets for fixing interior components of automobiles and adhesive sheets for fixing house building materials.

Advantageous Effects of Invention

The present invention provides a polyvinyl acetal resin composition that is moldable by an extrusion method and capable of exhibiting excellent heat resistance after molding. The present invention also provides an adhesive sheet containing the polyvinyl acetal resin composition, and a method for producing the adhesive sheet.

DESCRIPTION OF EMBODIMENTS

Embodiments of the present invention will be specifically described in the following with reference to, but not limited to, the examples.

<Preparation of Polyvinyl Butyral>

A reactor equipped with a stirrer was charged with 2,700 mL of ion exchange water and 300 g of polyvinyl alcohol having an average degree of polymerization of 1,700 and a degree of saponification of 99.3 mol %, and the contents were heated with stirring to be dissolved, thereby preparing a solution. To the obtained solution was added as a catalyst 35% by weight hydrochloric acid such that the hydrochloric acid concentration was set to 0.2% by weight. The temperature of the mixture was adjusted to 15° C., and 21 g of n-butyraldehyde (n-BA) was added thereto with stirring. Then, 145 g of n-butyraldehyde (n-BA) was further added, so that a polyvinyl butyral resin in the form of white particles was precipitated. Fifteen minutes after the precipitation, 35% by weight hydrochloric acid was added such that the hydrochloric acid concentration was set to 1.8% by weight. The mixture was heated to 50° C. and aged at 50° C. for two hours. After cooling and neutralization of the solution, the polyvinyl butyral resin was washed with water and then dried, thereby preparing polyvinyl butyral 1 (PVB1).

The obtained PVB1 had an average degree of polymerization of 1,700, a hydroxy group content of 31.3 mol %, an acetyl group content of 0.7 mol %, and a degree of butyralization (Bu degree) of 68.0 mol %.

Each obtained polyvinyl butyral is shown in Table 1.

Further, polyvinyl butyral 2 (PVB2) to polyvinyl butyral 5 (PVB5) were prepared by selecting the type of polyvinyl alcohol as a raw material and setting the conditions for butyralization.

TABLE 1

|  | PVB1 | PVB2 | PVB3 | PVB4 | PVB5 |
| --- | --- | --- | --- | --- | --- |
| Hydroxy group content (mol %) | 31.3 | 31.3 | 31.3 | 31.3 | 31.3 |
| Butyralization degree (mol %) | 68.0 | 68.0 | 68.0 | 68.0 | 68.0 |
| Acetyl group content (mol %) | 0.7 | 0.7 | 0.7 | 0.7 | 0.7 |
| Average degree of polymerization | 1700 | 2500 | 850 | 650 | 250 |

Example 1

To 100 parts by weight of PVB1 were added 0.2 parts by weight of trimethylolpropane triacrylate (TMPA) as a reactive diluent and 20 parts by weight of triethyleneglycol-di-2-ethylhexanoate (3GO) as a plasticizer. The mixture was sufficiently stirred, thereby obtaining a mixture composition. The mixture composition was sufficiently mixed with benzophenone (BP) as a photopolymerization initiator in an amount of 0.5 parts by weight relative to 100 parts by weight of the reactive diluent, thereby obtaining a polyvinyl butyral resin composition.

The obtained polyvinyl butyral resin composition was pressed at 120° C. and 10 MPa on the mold release-treated side of a mold release polyethylene terephthalate (PET) film having a thickness of 50 μm to achieve a thickness of 800 μm, and further cooled at 20° C. and 10 MPa while being pressurized with a press machine. Thus, an evaluation sample with a mold release PET film attached to each surface was obtained.

The obtained evaluation sample was irradiated with light having a wavelength of 365 nm at a dose of 4,000 mJ/cm$^2$ using an ultra-high pressure mercury lamp.

The storage moduli G' at 200° C. of the evaluation sample before and after irradiation with light were measured using a dynamic viscoelastometer (DVA-200 available from IT Measurement Co., Ltd.) under the condition that the temperature was lowered from 200° C. to −50° C. at a temperature decreasing rate of 3° C./min and under the conditions of a frequency of 1 Hz and a strain of 1%.

The capillary viscosity at 190° C. of the obtained polyvinyl butyral resin composition was measured by the method A2 specified in JIS K 7199 (1999) using a capillary rheometer (Toyo Seiki Seisaku-Sho, Ltd.). The shear rate was set at 10(1/s).

Examples 2 to 11 and Comparative Examples 1 to 5

Polyvinyl butyral resin compositions were prepared in the same manner as in Example 1 except that their formulations were as shown in Tables 2 and 3. The storage moduli G' at 200° C. before and after irradiation with light and the capillary viscosity at 190° C. were measured. In Tables 2 and 3, the number of parts of the photopolymerization initiator is a value relative to 100 parts by weight of the reactive diluent.

(Evaluation)

The polyvinyl butyral resin compositions obtained in the examples and comparative examples were evaluated by the following methods.

Tables 2 and 3 show the results.

(1) Evaluation of Extrusion Moldability

A T-die was attached to a small extruder (Labo Plasto Mill, Toyo Seiki Seisaku-Sho, Ltd.). The obtained polyvinyl butyral resin composition was extruded into a film at an extrusion temperature of 80° C. to 190° C. and a die outlet temperature of 190° C., whereby the extrusion moldability was evaluated. The rating "o (Good)" was given when the composition was formed into a film, and the rating "x (Poor)" was given when the composition was difficult to form into a film.

(2) Evaluation of Adhesiveness

The obtained polyvinyl butyral resin composition was applied to the mold release-treated surface of a mold release polyethylene terephthalate (PET) film having a thickness of 50 μm to a thickness of 800 μm. On the obtained polyvinyl butyral resin composition layer was placed another mold release PET film in such a manner that the mold release-treated surface thereof was in contact with the polyvinyl butyral resin composition layer, thereby preparing a laminate. The resulting sheet was left to stand at 23° C. for five days to give an evaluation sample having a mold release PET film attached to each surface.

The evaluation sample was cut to a size of 5 mm×100 mm and attached to glass. A plasma-treated polyethylene terephthalate (PET) film (25 mm×100 mm) was attached thereto, followed by vacuum lamination at 25° C. and then pressure bonding with heat in an autoclave at 75° C. and 0.5 MPa for 30 minutes. A laminate was thus prepared. The obtained laminate was subjected to 180° peel test at 300 ram/min in conformity with JIS K 6854:1994. The case where the peel strength was 5 N/25 mm or more was rated "o (Good)" and the case where the peel strength was less than 5 N/25 mm was rated "x (Poor)".

(3) Measurement of Breaking Strength

The obtained polyvinyl butyral resin composition was applied to the mold release-treated surface of a mold release polyethylene terephthalate (PET) film with a thickness of 50 μm to a thickness of 0.2 mm. On the obtained polyvinyl butyral resin composition layer was placed another mold release PET film in such a manner that the mold release-treated surface thereof was in contact with the polyvinyl butyral resin composition layer, thereby preparing a laminate. The resulting sheet was left to stand at 23° C. for five days to give an evaluation sample having a mold release PET film attached to each surface.

The obtained evaluation sample was irradiated with light having a wavelength of 365 nm at a dose of 5,000 mJ/cm$^2$ using an ultra-high pressure mercury lamp.

The evaluation sample was cut after irradiation with light to give a specimen (10 mm wide×about 100 mm long×about 0.2 mm thick).

The breaking strength of each obtained specimen was measured in conformity with JIS K 7161:2014. Specifically, the specimen was held between chucks at an initial inter-chuck distance of 10 mm and put in a thermostatic bath at 85° C. After the temperature stabilized, the breaking strength was measured by pulling the specimen using a TENSILON RTC (Orientec Co., Ltd.) at a pulling speed of 50 mm/min.

(4) Evaluation of Heat Resistance

The obtained polyvinyl butyral resin composition was applied to the mold release-treated surface of a mold release polyethylene terephthalate (PET) film having a thickness of 50 μm to a thickness of 0.2 mm. On the obtained polyvinyl butyral resin composition layer was placed another mold release PET film in such a manner that the mold release-treated surface thereof was in contact with the polyvinyl butyral resin composition layer, thereby preparing a laminate. The resulting sheet was left to stand at 23° C. for five days to give an evaluation sample having a mold release PET film attached to each surface.

A glass plate (100 mm×70 mm×2 mm thick) was bonded to a SUS plate (100 mm×70 mm×1 mm thick) with the evaluation sample interposed therebetween. The evaluation sample was irradiated from the glass plate side with light having a wavelength of 365 nm at a dose of 5,000 mJ/cm$^2$ using an ultra-high pressure mercury lamp.

Subsequently, the workpiece was hung in an oven at 85° C. with the SUS plate side fixed, and taken out after 24 hours. The misalignment between an edge of the SUS plate and an edge of the glass was visually checked. The rating "3 points" was given when the misalignment was 0.25 mm or less. The rating "2 points" was given when the misalignment was greater than 0.25 mm but not greater than 0.5 mm. The rating "1 point" was given when the misalignment was greater than 0.5 mm but not greater than 1 mm. The rating "0 point" was given when the misalignment was greater than 1 mm.

TABLE 2

|  |  | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|
| Resin | Type | PVB1 | PVB1 | PVB1 | PVB1 | PVB1 | PVB2 | PVB3 | PVB3 | PVB4 | PVB5 | PVB3 |
|  | Degree of polymerization | 1700 | 1700 | 1700 | 1700 | 1700 | 2500 | 850 | 850 | 650 | 250 | 850 |
|  | Number of parts (parts by weight) | 100 | 100 | 100 | 100 | 100 | 100 | 100 | 100 | 100 | 100 | 100 |
| Reactive diluent | Type | TMPA | TMPA | TMPA | TMPA | TMPA | TMPA | TMPA | TMPA | TMPA | TMPA | TMPA |
|  | Number of parts (parts by weight) | 0.2 | 4 | 30 | 30 | 30 | 3 | 8 | 4 | 4 | 15 | 30 |

TABLE 2-continued

|  |  | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|
| Photo-polymerization initiator | Type | BP | BP | BP | BP | BP | BP | BP | BP | BP | BP | BP |
|  | Number of parts (parts by weight) | 0.5 | 1 | 1 | 1 | 1 | 1 | 0.5 | 0.5 | 1 | 1 | 1 |
| Plasticizer | Type | 3GO | 3GO | 3GO | 3GO | 3GO | 3GO | 3GO | 3GO | 3GO | 3GO | 3GO |
|  | Number of parts (parts by weight) | 20 | 30 | 20 | 1 | 30 | 30 | 20 | 12.5 | 13 | 15 | 1 |
| Storage modulus G' (Pa) at 200° C. | Before irradiation with light | $2.9 \times 10^4$ | $1.5 \times 10^4$ | $9.8 \times 10^3$ | $3.9 \times 10^4$ | $5.9 \times 10^3$ | $7.0 \times 10^4$ | $1.4 \times 10^3$ | $2.2 \times 10^3$ | $4.5 \times 10^5$ | $1.5 \times 10^5$ | $2.1 \times 10^5$ |
|  | After irradiation with light | $6.1 \times 10^4$ | $1.3 \times 10^5$ | $7.9 \times 10^5$ | $1.2 \times 10^6$ | $7.7 \times 10^5$ | $1.8 \times 10^5$ | $8.9 \times 10^4$ | $1.1 \times 10^4$ | $9.3 \times 10^3$ | $9.1 \times 10^3$ | $8.5 \times 10^5$ |
| Breaking strength (MPa) |  | 0.79 | 1.44 | 2.55 | 3.21 | 1.88 | 0.96 | 1.17 | 0.93 | 0.32 | 1.94 | 2.15 |
| Capillary viscosity at 190° C. (Pa · s) (before irradiation with light) |  | 3700 | 1300 | 900 | 1500 | 650 | 6000 | 200 | 440 | 220 | 150 | 410 |
| Evaluation | Extrusion moldability | ○ | ○ | ○ | ○ | ○ | ○ | ○ | ○ | ○ | ○ | ○ |
|  | Adhesiveness | ○ | ○ | ○ | ○ | ○ | ○ | ○ | ○ | ○ | ○ | ○ |
|  | Heat resistance | 3 points | 3 points | 3 points | 3 points | 3 points | 3 points | 2 points | 2 points | 1 point | 2 points | 3 points |

* Number of parts of photopolymerization initiator is a value relative to 100 parts by weight of reactive diluent

TABLE 3

|  |  | Comparative Example 1 | Comparative Example 2 | Comparative Example 3 | Comparative Example 4 | Comparative Example 5 |
|---|---|---|---|---|---|---|
| Resin | Type | PVB1 | PVB3 | PVB3 | PVB3 | PVB1 |
|  | Degree of polymerization | 1700 | 850 | 850 | 850 | 1700 |
|  | Number of parts (parts by weight) | 100 | 100 | 100 | 100 | 100 |
| Reactive diluent | Type | TMPA | — | TMPA | TMPA | TMPA |
|  | Number of parts (parts by weight) | 1 | — | 0.05 | 35 | 4 |
| Photo-polymerization initiator | Type | BP | — | BP | BP | BP |
|  | Number of parts (parts by weight) | 1 | — | 1 | 1 | 0.5 |
| Plasticizer | Type | 3GO | 3GO | 3GO | 3GO | 3GO |
|  | Number of parts (parts by weight) | 0.5 | 35 | 30 | 0 | 0 |
| Storage modulus G' (Pa) at 200° C. | Before irradiation with light | $1.1 \times 10^5$ | $7.2 \times 10^2$ | $9.1 \times 10^2$ | $8.9 \times 10^4$ | $8.5 \times 10^4$ |
|  | After irradiation with light | $1.3 \times 10^5$ | $7.2 \times 10^2$ | $9.8 \times 10^2$ | $9.5 \times 10^5$ | $1.4 \times 10^6$ |
| Breaking strength (MPa) |  | — | 0.07 | 0.08 | — | — |
| Capillary viscosity at 190° C. (Pa · s) (before irradiation with light) |  | 15000 | 120 | 160 | 12000 | 9800 |
| Evaluation | Extrusion moldability | x | ○ | ○ | x | x |
|  | Adhesiveness | — | ○ | ○ | — | — |
|  | Heat resistance | — | 0 point | 0 point | — | — |

* Number of parts of photopolymerization initiator is a value relative to 100 parts by weight of reactive diluent

INDUSTRIAL APPLICABILITY

The present invention provides a polyvinyl acetal resin composition that is moldable by an extrusion method and capable of exhibiting excellent heat resistance after molding. The present invention also provides an adhesive sheet containing the polyvinyl acetal resin composition, and a method for producing the adhesive sheet.

The invention claimed is:
1. A polyvinyl acetal resin composition comprising:
a polyvinyl acetal;
a reactive diluent; and
a photopolymerization initiator, the polyvinyl acetal resin composition having a storage modulus G' at 200° C. before irradiation with light of $1.5\times10^2$ Pa to $7.0\times10^4$ Pa and a storage modulus G' at 200° C. after irradiation with light of $9.1\times10^3$ Pa to $1.2\times10^6$ Pa, with the storage modulus G' at 200° C. after irradiation with light being higher than the storage modulus G' at 200° C. before irradiation with light.

2. The polyvinyl acetal resin composition according to claim 1,
wherein the polyvinyl acetal resin composition has a capillary viscosity at 190° C. before irradiation with light of 7,000 Pa·s or lower.

3. The polyvinyl acetal resin composition according to claim 1,
wherein the polyvinyl acetal resin composition has a breaking strength at 85° C. of 0.3 MPa or higher.

4. The polyvinyl acetal resin composition according to claim 1,
wherein the polyvinyl acetal is polyvinyl butyral.

5. The polyvinyl acetal resin composition according to claim 1,
wherein the reactive diluent is a (meth)acrylic reactive diluent, an epoxy reactive diluent, or a silicone reactive diluent.

6. The polyvinyl acetal resin composition according to claim 1,
wherein the amount of the reactive diluent is 0.1 to 30 parts by weight relative to 100 parts by weight of the polyvinyl acetal.

7. The polyvinyl acetal resin composition according to claim 1, further comprising a plasticizer.

8. The polyvinyl acetal resin composition according to claim 7,
wherein the amount of the plasticizer is 1 to 30 parts by weight relative to 100 parts by weight of the polyvinyl acetal.

9. The polyvinyl acetal resin composition according to claim 8,
wherein the amount of the plasticizer is 1 to 15 parts by weight relative to 100 parts by weight of the polyvinyl acetal.

10. An adhesive sheet comprising:
the polyvinyl acetal resin composition according to claim 1.

* * * * *